United States Patent
Frost et al.

(10) Patent No.: US 9,094,323 B2
(45) Date of Patent: Jul. 28, 2015

(54) PROBE PACKET DISCOVERY OF ENTROPY VALUES CAUSING SPECIFIC PATHS TO BE TAKEN THROUGH A NETWORK

(71) Applicants: Daniel C. Frost, Feltham (GB); Stewart Frederick Bryant, Merstham (GB)

(72) Inventors: Daniel C. Frost, Feltham (GB); Stewart Frederick Bryant, Merstham (GB)

(73) Assignee: Cisco Technology, Inc., San Jose, CA (US)

( * ) Notice: Subject to any disclaimer, the term of this patent is extended or adjusted under 35 U.S.C. 154(b) by 241 days.

(21) Appl. No.: 13/928,327

(22) Filed: Jun. 26, 2013

(65) Prior Publication Data

US 2015/0003255 A1    Jan. 1, 2015

(51) Int. Cl.
*H04L 12/707* (2013.01)
*H04L 12/26* (2006.01)

(52) U.S. Cl.
CPC ............ *H04L 45/24* (2013.01); *H04L 43/12* (2013.01)

(58) Field of Classification Search
None
See application file for complete search history.

(56) References Cited

U.S. PATENT DOCUMENTS

| | | | | |
|---|---|---|---|---|
| 8,718,060 | B2* | 5/2014 | Swallow | 370/392 |
| 8,787,400 | B1* | 7/2014 | Barth et al. | 370/419 |
| 2009/0168664 | A1* | 7/2009 | Washburn | 370/254 |
| 2009/0296579 | A1* | 12/2009 | Dharwadkar et al. | 370/235 |
| 2012/0063314 | A1* | 3/2012 | Pignataro et al. | 370/235 |
| 2012/0134266 | A1* | 5/2012 | Roitshtein et al. | 370/230 |
| 2012/0201241 | A1* | 8/2012 | Subramanian et al. | 370/389 |
| 2012/0327941 | A1* | 12/2012 | Villamizar | 370/394 |
| 2014/0098675 | A1* | 4/2014 | Frost et al. | 370/241.1 |
| 2014/0310391 | A1* | 10/2014 | Sorenson et al. | 709/223 |

OTHER PUBLICATIONS

Kompella et al., "The Use of Entropy Labels in MPLS Forwarding," draft-ietf-mpls-entropy-label-06, Sep. 6, 2012, The Internet Society, Reston, VA, USA (twenty-three pages).

Kompella et al., "Detecting Multi-Protocol Label Switched (MPLS) Data Plane Failures," RFC 4379, Feb. 2006, The Internet Society, Reston, VA, USA (fifty pages).

* cited by examiner

*Primary Examiner* — Brian Roberts
(74) *Attorney, Agent, or Firm* — The Law Office of Kirk D. Williams

(57) ABSTRACT

In one embodiment, probe-packet discovery of entropy values causing specific paths to be taken through a network is performed. One embodiment sends, from a first network node to a second network node in a network, a plurality of Equal Cost Multipath (ECMP) path-taken probe packets, each with a different entropy label, to determine a particular entropy label for each particular ECMP path of a plurality of different ECMP paths between the first network node and the second network node that will cause a packet including the particular entropy label to traverse said particular ECMP path. The ECMP paths taken by the plurality of ECMP path-taken probe packets is analyzed to determine one or more entropy labels for each different ECMP path of the plurality of different ECMP paths that will cause a packet including one of said one or more entropy labels to traverse said different ECMP path.

20 Claims, 4 Drawing Sheets

PROBE PACKET DISCOVERY OF ENTROPY VALUES CAUSING SPECIFIC PATHS TO BE TAKEN THROUGH A NETWORK

TECHNICAL FIELD

The present disclosure relates generally to forwarding packets in a communications network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Equal Cost Multipath routing (ECMP) is used to load balance packets being communicated across a network by allowing the traffic to use multiple paths. Packets of different flows are load balanced across multiple paths in a manner that packets of a same flow follow a same path. ECMP selects which path a particular packet will take by processing certain fields of the particular packet. These field(s) may include an entropy value.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
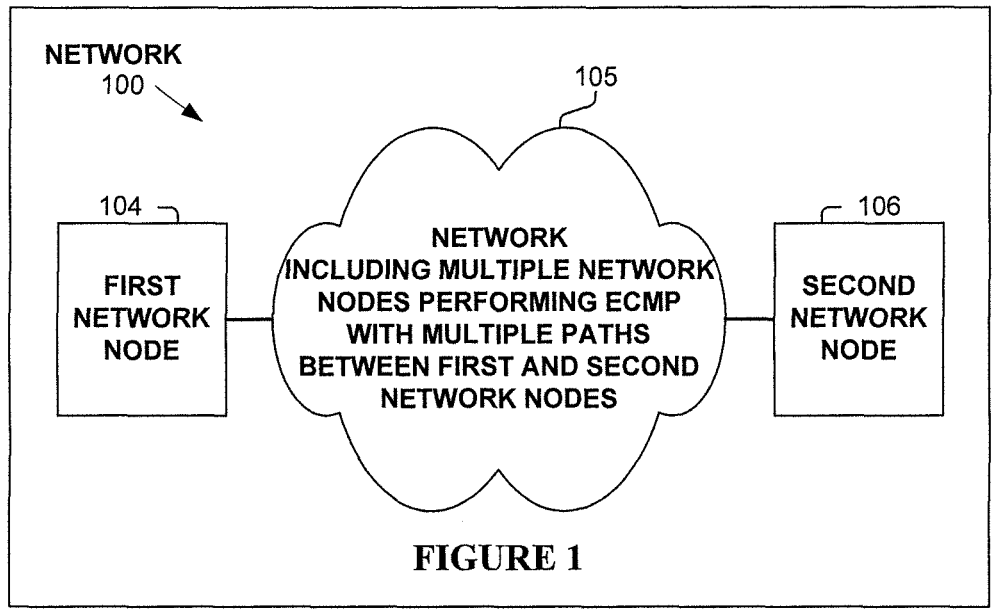
FIG. 1 illustrates a network operating according to one embodiment.

Disclosed are, inter alia, methods, apparatus, computer-storage media, mechanisms, and means associated with probe-packet discover of entropy values causing specific paths to be taken through a network. One embodiment includes: sending, from a first network node to a second network node in a network, a plurality of Equal Cost Multipath (ECMP) path-taken probe packets, each with a different entropy label, to determine a particular entropy label for each particular ECMP path of a plurality of different ECMP paths between the first network node and the second network node that will cause a packet including the particular entropy label to traverse said particular ECMP path; and analyzing the ECMP paths taken by the plurality of ECMP path-taken probe packets to determine one or more entropy labels for each different ECMP path of the plurality of different ECMP paths that will cause a packet including one of said one or more entropy labels to traverse said different ECMP path; wherein one or more other nodes along said particular ECMP path perform ECMP forwarding based on an entropy label included in a packet. One embodiment includes receiving a plurality of ECMP path-taken response packets corresponding to the plurality of ECMP path-taken probe packets which include path taken information for the corresponding path-taken probe packet.

2. Description

Disclosed are, inter alia, methods, apparatus, computer-storage media, mechanisms, and means associated with probe-packet discovery of entropy values causing specific paths to be taken through a network. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x"

and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

One embodiment is used in monitoring specific paths through a network, such as, but not limited to, between two edge routers of a provider network. When Equal Cost Multipath routing (ECMP) is employed in a network, the specific path a particular packet will traverse is not known. A sending network node has acquired the routing information of the network, but the particular ECMP procedure taken by other packet switching devices in the network is not known or can vary, as well as the basis on which the ECMP distribution is performed can vary. The specific mechanism used to select a path typically is based on a non-standard, not publicly disclosed hash function which may be different per network node and may change over time. Operations, administration, and maintenance (e.g., including measuring service level compliance) monitoring of specific paths using real data traffic or probe packets is problematic in this context as packets cannot be guaranteed to take a particular desired specific path.

One embodiment exercises the network to discover how the network forwards packets with different entropy values over ECMP paths. ECMP path-taken probe packets are used to search the space of ECMP paths by including various entropy values (e.g., entropy labels or values in an entropy field while having the same values in other labels/fields on which the network performs ECMP in the probe packets— and subsequently sent packets such as operations packets desired to take a specific ECMP path) in different probe packets and recording the path taken by each of the probe packets. In this manner, a set of mappings between an entropy label and a specific ECMP path can be determined. Subsequently, a particular packet (e.g., an operations packet) can be forced to follow a specific desired path over which ECMP is performed by including the entropy label corresponding to the desired path. This determination may be made once, periodically, or even in response to various changes in the routing information of the network. In one embodiment, network nodes along the path taken by a probe packet append an identifier (e.g., of the node, or interface) to a traversal list, such that the specific ECMP path(s) taken by the probe packet can be readily identified.

One embodiment includes a method, comprising: sending, from a first network node to a second network node in a network, a plurality of Equal Cost Multipath (ECMP) path taken probe packets, each with a different entropy label, to determine a particular entropy label for each particular ECMP path of a plurality of different ECMP paths between the first network node and the second network node that will cause a packet including the particular entropy label to traverse said particular ECMP path; and analyzing the ECMP paths taken by the plurality of ECMP path taken probe packets to determine one or more entropy labels for each different ECMP path of the plurality of different ECMP paths that will cause a packet, including one of said one or more entropy labels, to traverse said different ECMP path; wherein one or more other nodes along said particular ECMP path perform ECMP forwarding based on an entropy label included in a packet.

One embodiment includes adding to an ordered list within each particular ECMP path taken probe packet an identification of each traversed network node between the first and second network nodes; wherein said analyzing the path is performed based on said order lists. One embodiment includes receiving by the first network node said ordered lists of network nodes traversed by each of the plurality of ECMP path taken probe packets; and wherein said analyzing operation is performed by said first network node. In one embodiment, said operation of adding to the ordered list is performed in response to in response to a Time to Live (TTL) expiry at said each traversed network node between the first and second network nodes.

One embodiment includes: selecting a selected ECMP path of the plurality of different ECMP paths over which to send a particular packet; selecting a particular entropy label from said determined labels to cause the particular packet to be sent over the selected ECMP path; and sending, from the first network node to the second network node, the particular packet including the particular entropy label.

One embodiment includes a method, comprising: sending, by a first network node to a second network node through a network performing Equal Cost Multipath routing (ECMP), a plurality of ECMP path taken probe packets with each of the plurality of ECMP path taken probe packets including a different ECMP label of a plurality of ECMP labels, wherein each of the plurality of ECMP labels are used by said sending operation, and wherein a plurality of different ECMP paths are taken through the network between the first and second network nodes by packets of the plurality of ECMP path taken probe packets; receiving a plurality of ECMP path taken response packets corresponding to the plurality of ECMP path taken probe packets; and analyzing each of said received plurality of ECMP path taken response packets to identify a mapping between each particular path of the plurality of different ECMP paths and one or more of the plurality of ECMP labels that resulted in said particular path to be taken.

One embodiment includes: selecting a selected ECMP path of the plurality of different ECMP paths over which to send a particular packet; selecting a particular ECMP label from the plurality of ECMP labels based on said mappings to cause the particular packet to be sent over the selected ECMP path; and sending, from the first network node to the second network node, the particular packet including the particular ECMP label.

8. The method of claim 7, wherein said operation of receiving a plurality of ECMP path taken response packets is performed by the first network node.

9. The method of claim 8, wherein said operation of analyzing each of said received plurality of ECMP path taken response packets is performed by the first network node.

10. The method of claim 9, wherein said operation of selecting the particular ECMP label is performed by the first network node.

11. The method of claim 7, wherein each of the plurality of ECMP path taken probe packets and the particular packet is an Operations, Administration, and Maintenance (OAM) packet.

12. The method of claim 7, wherein the particular packet is a Multiprotocol Label Switching (MPLS) packet.

13. The method of claim 6, comprising: associating in a forwarding data structure each particular Forwarding Equivalence Class (FEC) of a plurality of Forwarding Equivalence Classes (FECs) to one of the plurality of ECMP labels to cause packets associated with the particular FEC to be sent over a corresponding said mapped one of the plurality of different ECMP paths. One embodiment includes randomly selecting one or more of the plurality of ECMP labels used in the operation of said sending the plurality of ECMP path taken probe packets. One embodiment includes performing another iteration of each of the sending, receiving, and analyzing operations in response to a change in network topology. In one embodiment, each of the plurality of ECMP path taken response packets includes an ordered list of nodes traversed by a corresponding one of the plurality of ECMP path taken probe packets in going from the first network node to the second network node. One embodiment includes verifying that each ECMP forwarded path between the first and second network nodes is included in the plurality of different ECMP paths. One embodiment includes determining said each ECMP forwarded path between the first and second network nodes based on network topology information from one or more routing or forwarding databases.

One embodiment includes a packet switching device, comprising: one or more processing elements; memory; a plurality of interfaces configured to send and receive packets; and one or more packet switching mechanisms configured to packet switch packets among said interfaces. The one or more processing elements are configured to perform operations, including: sending, to a second network node in a network from a same one of the plurality of interfaces, a plurality of Equal Cost Multipath (ECMP) path taken probe packets, each with a different entropy label, for determining a particular entropy label for each particular ECMP path of a plurality of different ECMP paths between the packet switching device and the second network node that will cause a packet including the particular entropy label to traverse said particular ECMP path; selecting a selected ECMP path of the plurality of different ECMP paths over which to send a particular packet; selecting a particular entropy label from said determined labels to cause the particular packet to be sent over the selected ECMP path; and sending, from the first network node to the second network node, the particular packet including the particular entropy label.

One embodiment includes randomly selecting one or more of the plurality of ECMP labels used in the operation of said sending the plurality of ECMP path taken probe packets.

Turning to the figures, FIG. 1 illustrates a network 100 operating according to one embodiment. As shown, first network node 104 sends multiple ECMP path-taken probe packets, including different entropy values, to second network node 106 through network 105. Network 105 performs ECMP based, inter alia, on the entropy value (and typically also on fields identifying the packet flow which the packet belongs). By only varying the entropy value of the fields that affect the path taken by a probe packet between first network node 104 and second network node 106, one embodiment determines mappings between entropy values and specific paths. Subsequent packets (e.g., operations packets to monitor a specific path) can use these mappings to select the appropriate entropy label to force the packet to follow the same path (e.g., with the other ECMP-affecting fields the same as those of the probe packet).

In one embodiment, the probe packet includes a list of path traversal identifying information (e.g., an identifier of each traversed node or traversed node/interface) that is updated as it traverses through the network. In one embodiment, second network node 106 sends an ECMP response packet back to first network node 104 such that it can determine the mappings between ECMP paths and entropy labels. In one embodiment, second network node 106 (or other node or management system) determines the mappings between ECMP paths and entropy labels.

Figure 2:
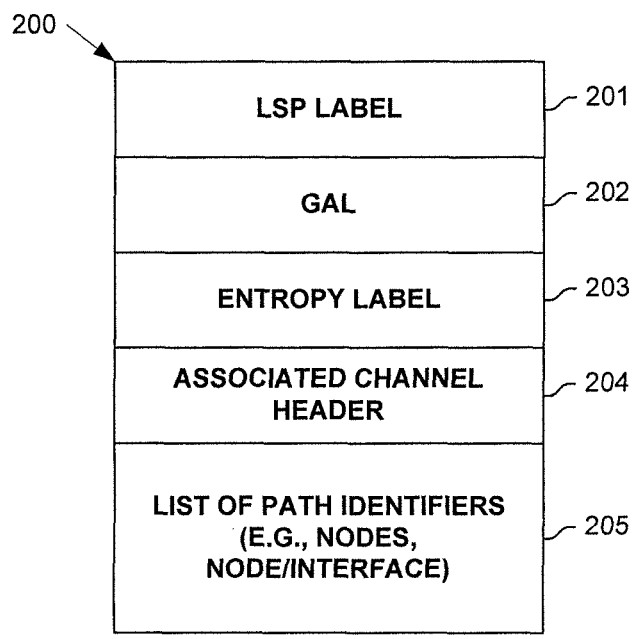
FIG. 2 illustrates a packet format according to one embodiment.

A portion 200 of a packet format of an ECMP probe and/or reply packet used in one embodiment is illustrated in FIG. 2. As shown, portion 200 includes a label switched path (LSP) label 201; G-ACH label (GAL) 202, entropy label 203, associated channel header 204 (identifying that list of path identifiers 205 follows); and a list of path identifiers 205.

Figure 3A:
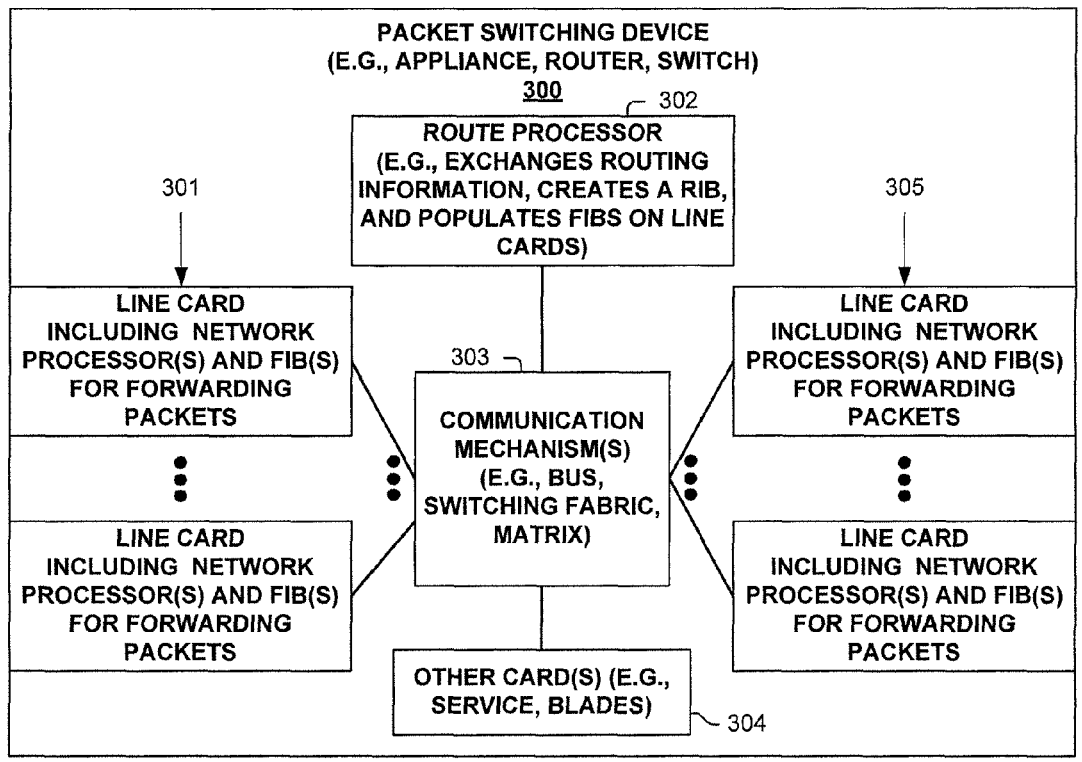
FIG. 3A illustrates a packet switching device according to one embodiment.

One embodiment of a packet switching device 300 (e.g., one example of a network node) is illustrated in FIG. 3A. As shown, packet switching device 300 includes multiple line cards 301 and 305, each with one or more network interfaces for sending and receiving packets over communications links, and with one or more processing elements that are used in one embodiment associated with probe-packet discovery of entropy values causing specific paths to be taken through a network. Packet switching device 300 also has a control plane with one or more processing elements 302 for managing the control plane and/or control plane processing of packets associated with probe-packet discovery of entropy values causing specific paths to be taken through a network. Packet switching device 300 also includes other cards 304 (e.g., service cards, blades) which include processing elements that are used in one embodiment to process packets associated with probe-packet discovery of entropy values causing specific paths to be taken through a network, and some communication mechanism 303 (e.g., bus, switching fabric, matrix) for allowing its different entities 301, 302, 304 and 305 to communicate.

Figure 3B:
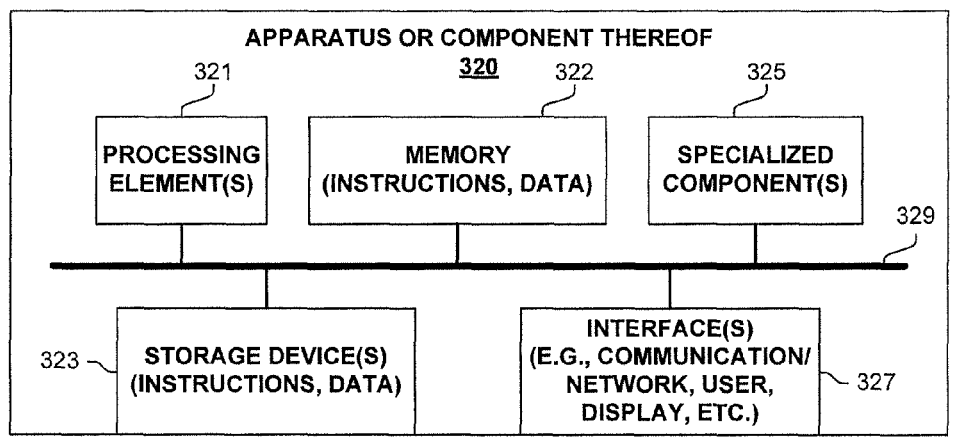
FIG. 3B illustrates an apparatus according to one embodiment.

FIG. 3B is a block diagram of an apparatus 320 used in one embodiment associated with probe-packet discovery of entropy values causing specific paths to be taken through a network. In one embodiment, apparatus 320 performs one or more processes, or portions thereof, corresponding to one of the flow diagrams illustrated or otherwise described herein, and/or illustrated in another diagram or otherwise described herein.

In one embodiment, apparatus 320 includes one or more processing element(s) 321, memory 322, storage device(s) 323, specialized component(s) 325 (e.g. optimized hardware such as for performing lookup and/or packet processing operations, etc.), and interface(s) 327 for communicating information (e.g., sending and receiving packets, user-interfaces, displaying information, etc.), which are typically communicatively coupled via one or more communications mechanisms 329, with the communications paths typically tailored to meet the needs of a particular application.

Various embodiments of apparatus 320 may include more or fewer elements. The operation of apparatus 320 is typically controlled by processing element(s) 321 using memory 322 and storage device(s) 323 to perform one or more tasks or processes. Memory 322 is one type of computer-readable/computer-storage medium, and typically comprises random access memory (RAM), read only memory (ROM), flash memory, integrated circuits, and/or other memory components. Memory 322 typically stores computer-executable instructions to be executed by processing element(s) 321 and/or data which is manipulated by processing element(s) 321 for implementing functionality in accordance with an embodiment. Storage device(s) 323 are another type of computer-readable medium, and typically comprise solid state storage media, disk drives, diskettes, networked services, tape drives, and other storage devices. Storage device(s) 323 typically store computer-executable instructions to be executed by processing element(s) 321 and/or data which is manipulated by processing element(s) 321 for implementing functionality in accordance with an embodiment.

Figure 4:
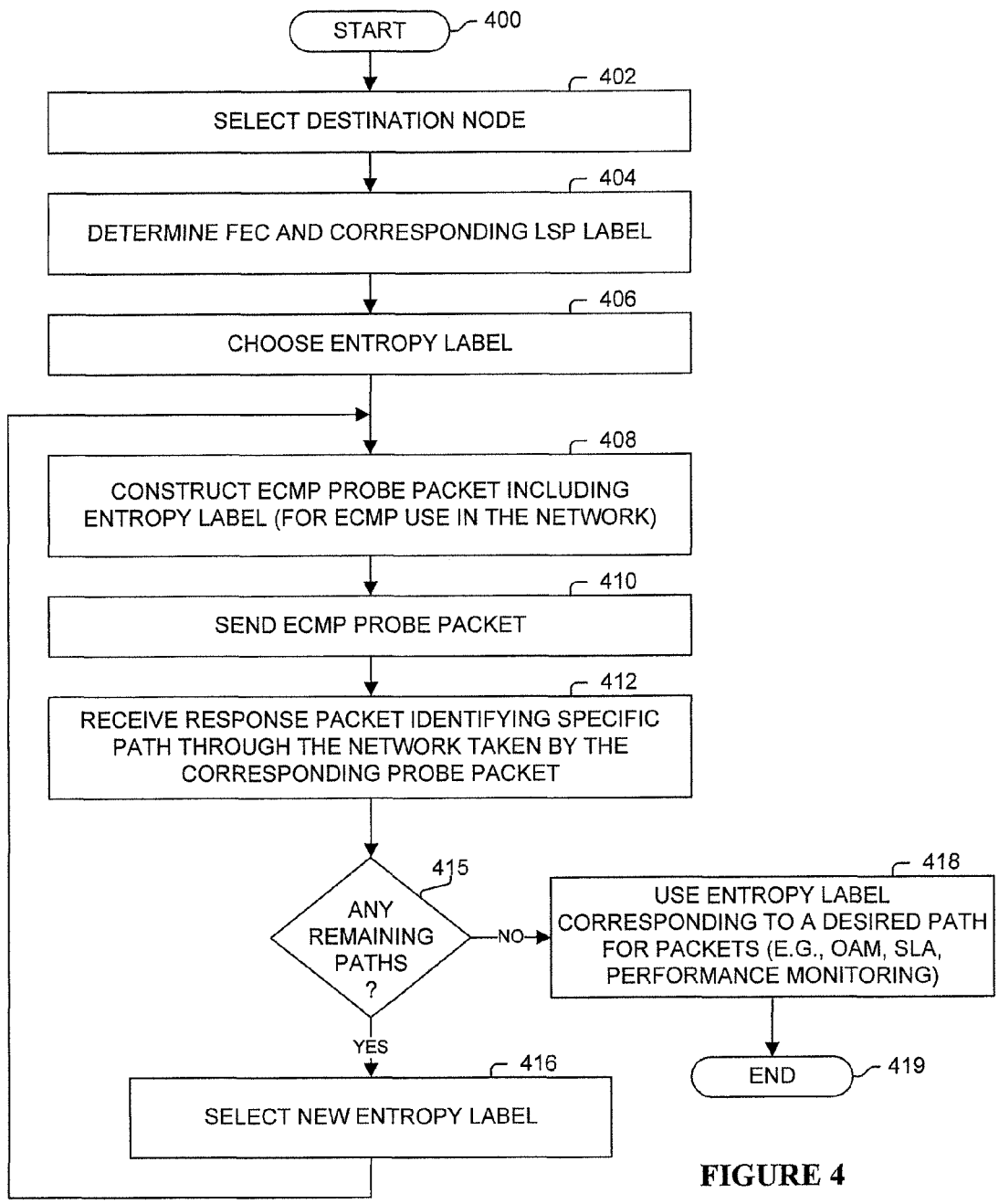
FIG. 4 illustrates a process according to one embodiment.

FIG. 4 illustrates a process performed in one embodiment by a particular source network node sending label switched packets. The same process applies to other types of packets, but addresses and header fields are used instead of labels.

Processing of the flow diagram of FIG. 4 begins with process block 400. In process block 402, destination network node is selected to which to send ECMP path-taken probe packets. In process block 404, a forwarding equivalence class (FEC) and corresponding label (or destination address in other types of packets) is determined for the selected destination network node. In process block 406, a first entropy label (e.g., entropy value) is chosen, such as by, but not limited to, randomly selecting, selecting a first value of a range of values, or using another technique.

Until an entropy label value has been determined for each ECMP path between the particular source network node and the destination network node, process blocks 408-416 are repeated. In process block 408, an ECMP path-taken probe packet is constructed that includes the entropy label chosen in process block 406 (for the first iteration through process blocks 408-416) or 416 (for subsequent iterations). In one embodiment, the Time-to-Live (TTL) value (e.g., in a label) of the ECMP probe packet is set to one (1) to cause the next receiving network node (e.g., packet switching device) to look at the received packet, inspecting the packet to identify that it is in fact a probe packet, and then to correspondingly process the probe packet (e.g., add a path identifier to a list of path identifiers). In one embodiment, the list of path identifiers is initialized to an identifier of the source network node, or a particular interface thereof. In process block 410, this ECMP probe packet is sent from a same interface towards the destination network node using normal packet processing. In process block 412, a response packet is received that identifies the specific path through the network taken by the corresponding probe packet. In one embodiment, process block 412 is part of a different process so that multiple ECMP probe packets are sent in parallel to waiting for receiving corresponding response packets. As determined in process block 415, if there are any remaining paths for which a corresponding entropy label has not been identified (typically this process will discover multiple entropy labels for causing a same ECMP path to be taken), then in process block 416, a next entropy label is selected (e.g., randomly, next in an a predetermined search order). Processing returns to process block 408.

When an entropy label (e.g., entropy value) has been identified for each particular ECMP path as determined in process block 415, processing proceeds to process block 418, wherein entropy labels are used to force packets to follow specific ECMP paths. Processing of the flow diagram of FIG. 4 is complete as indicated by process block 419.

Figure 5:
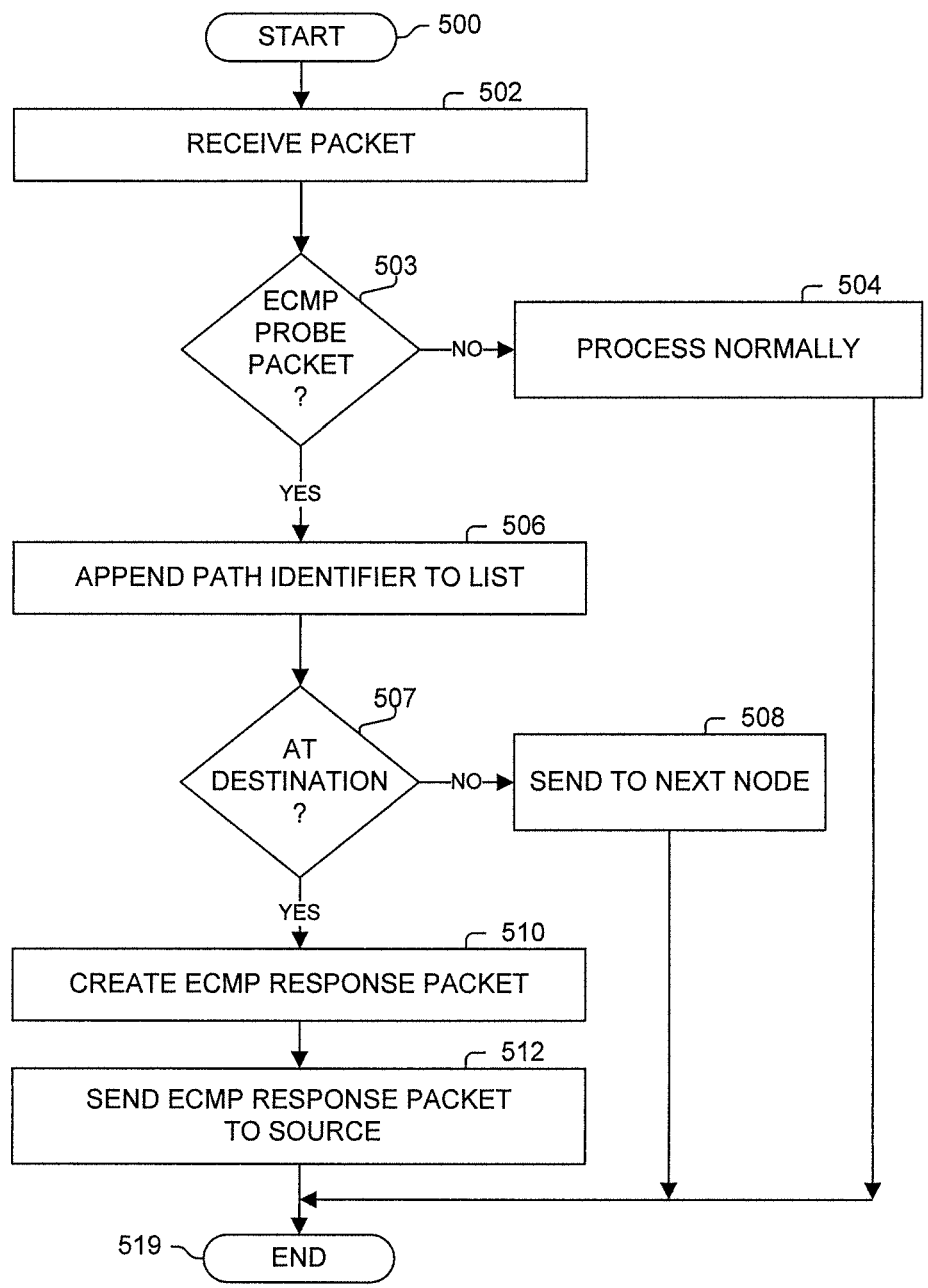
FIG. 5 illustrates a process according to one embodiment.

FIG. 5 illustrates a process performed in one embodiment by a network node (e.g., the destination network node, a network node between the source and destination network nodes). Processing begins with process block 500. In process block 502, a packet is received. As determined in process block 503, if the packet is not an ECMP probe packet, then the packet is processed normally in process block 504. In one embodiment, the TTL of the packet received in process block 502 is expired so the node performs process block 503.

Otherwise, the received packet is determined in process block 503 to be an ECMP probe packet (e.g., after inspecting the packet to determine that it is of this type, such as after a TTL expiry to cause this inspection). In process block 506, a path identifier is appended to the list of path identifiers.

As determined in process block 507, if the received ECMP probe packet has not reached its destination, then in process block 508, the ECMP probe packet (with its updated path identifier list) is forwarded to a next node, possibly using ECMP. Otherwise, the received ECMP probe packet has reached its destination as determined in process block 507. Then, in process block 510, a corresponding ECMP response packet is created which includes the list of path identifiers taken by the received ECMP probe packet; and in process block 512, the ECMP response packet is sent to the source network node (or another node or system such as a network management system to determine the mappings). In one embodiment, the destination network node determines the mappings and sends them, rather than or in addition to, the list of path identifiers to the source network node.

Processing of the flow diagram of FIG. 5 is complete as indicated by process block 519.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
    sending, from a first network node to a second network node in a network, a plurality of Equal Cost Multipath (ECMP) path-taken probe packets, each with a different entropy label, to determine a particular entropy label for each particular ECMP path of a plurality of different ECMP paths between the first network node and the second network node that will cause a packet including the particular entropy label to traverse said particular ECMP path; and
    analyzing the ECMP paths taken by the plurality of ECMP path-taken probe packets to determine one or more entropy labels for each different ECMP path of the plurality of different ECMP paths that will cause a packet, including one of said one or more entropy labels, to traverse said different ECMP path; wherein one or more other nodes along said particular ECMP path perform ECMP forwarding based on an entropy label included in a packet.

2. The method of claim 1, comprising adding to an ordered list within each particular ECMP path-taken probe packet an identification of each traversed network node between the first and second network nodes; wherein said analyzing the path is performed based on said order lists.

3. The method of claim 2, comprising receiving by the first network node said ordered lists of network nodes traversed by each of the plurality of ECMP path-taken probe packets; and wherein said analyzing operation is performed by said first network node.

4. The method of claim 2, wherein said operation of adding to the ordered list is performed in response to in response to a Time-to-Live (TTL) expiry at said each traversed network node between the first and second network nodes.

5. The method of claim 1, comprising:
selecting a selected ECMP path of the plurality of different ECMP paths over which to send a particular packet;
selecting a particular entropy label from said determined labels to cause the particular packet to be sent over the selected ECMP path; and
sending, from the first network node to the second network node, the particular packet including the particular entropy label.

6. A method, comprising:
sending, by a first network node to a second network node through a network performing Equal Cost Multipath routing (ECMP), a plurality of ECMP path-taken probe packets with each of the plurality of ECMP path-taken probe packets including a different ECMP label of a plurality of ECMP labels, wherein each of the plurality of ECMP labels are used by said sending operation, and wherein a plurality of different ECMP paths are taken through the network between the first and second network nodes by packets of the plurality of ECMP path-taken probe packets;
receiving a plurality of ECMP path-taken response packets corresponding to the plurality of ECMP path-taken probe packets; and
analyzing each of said received plurality of ECMP path-taken response packets to identify a mapping between each particular path of the plurality of different ECMP paths and one or more of the plurality of ECMP labels that resulted in said particular path to be taken.

7. The method of claim 6, comprising:
selecting a selected ECMP path of the plurality of different ECMP paths over which to send a particular packet;
selecting a particular ECMP label from the plurality of ECMP labels based on said mappings to cause the particular packet to be sent over the selected ECMP path; and
sending, from the first network node to the second network node, the particular packet including the particular ECMP label.

8. The method of claim 7, wherein said operation of receiving a plurality of ECMP path-taken response packets is performed by the first network node.

9. The method of claim 8, wherein said operation of analyzing each of said received plurality of ECMP path-taken response packets is performed by the first network node.

10. The method of claim 9, wherein said operation of selecting the particular ECMP label is performed by the first network node.

11. The method of claim 7, wherein each of the plurality of ECMP path-taken probe packets and the particular packet is an Operations, Administration, and Maintenance (OAM) packet.

12. The method of claim 7, wherein the particular packet is a Multiprotocol Label Switching (MPLS) packet.

13. The method of claim 6, comprising associating in a forwarding data structure each particular Forwarding Equivalence Class (FEC) of a plurality of Forwarding Equivalence Classes (FECs) to one of the plurality of ECMP labels to cause packets associated with the particular FEC to be sent over a corresponding said mapped one of the plurality of different ECMP paths.

14. The method of claim 6, comprising randomly selecting one or more of the plurality of ECMP labels used in the operation of said sending the plurality of ECMP path-taken probe packets.

15. The method of claim 6, comprising performing another iteration of each of the sending, receiving, and analyzing operations in response to a change in network topology.

16. The method of claim 6, wherein each of the plurality of ECMP path-taken response packets includes an ordered list of nodes traversed by a corresponding one of the plurality of ECMP path-taken probe packets in going from the first network node to the second network node.

17. The method of claim 6, comprising verifying that each ECMP forwarded path between the first and second network nodes is included in the plurality of different ECMP paths.

18. The method of claim 17, comprising determining said each ECMP forwarded path between the first and second network nodes based on network topology information from one or more routing or forwarding databases.

19. A packet switching device, comprising:
one or more processing elements;
memory;
a plurality of interfaces configured to send and receive packets; and
one or more packet switching mechanisms configured to packet switch packets among said interfaces;
wherein said one or more processing elements are configured to perform operations, including:
sending, to a second network node in a network from a same one of the plurality of interfaces, a plurality of Equal Cost Multipath (ECMP) path-taken probe packets, each with a different entropy label, for determining a particular entropy label for each particular ECMP path of a plurality of different ECMP paths between the packet switching device and the second network node that will cause a packet including the particular entropy label to traverse said particular ECMP path;
selecting a selected ECMP path of the plurality of different ECMP paths over which to send a particular packet;
selecting a particular entropy label from said determined labels to cause the particular packet to be sent over the selected ECMP path; and
sending, from the first network node to the second network node, the particular packet including the particular entropy label.

20. The packet switching device of claim 19, comprising randomly selecting one or more of the plurality of ECMP labels used in the operation of said sending the plurality of ECMP path-taken probe packets.

* * * * *